C. BYRNE.
SPRING WHEEL.
APPLICATION FILED APR. 30, 1914.
1,203,480.
Patented Oct. 31, 1916.
2 SHEETS—SHEET 1.
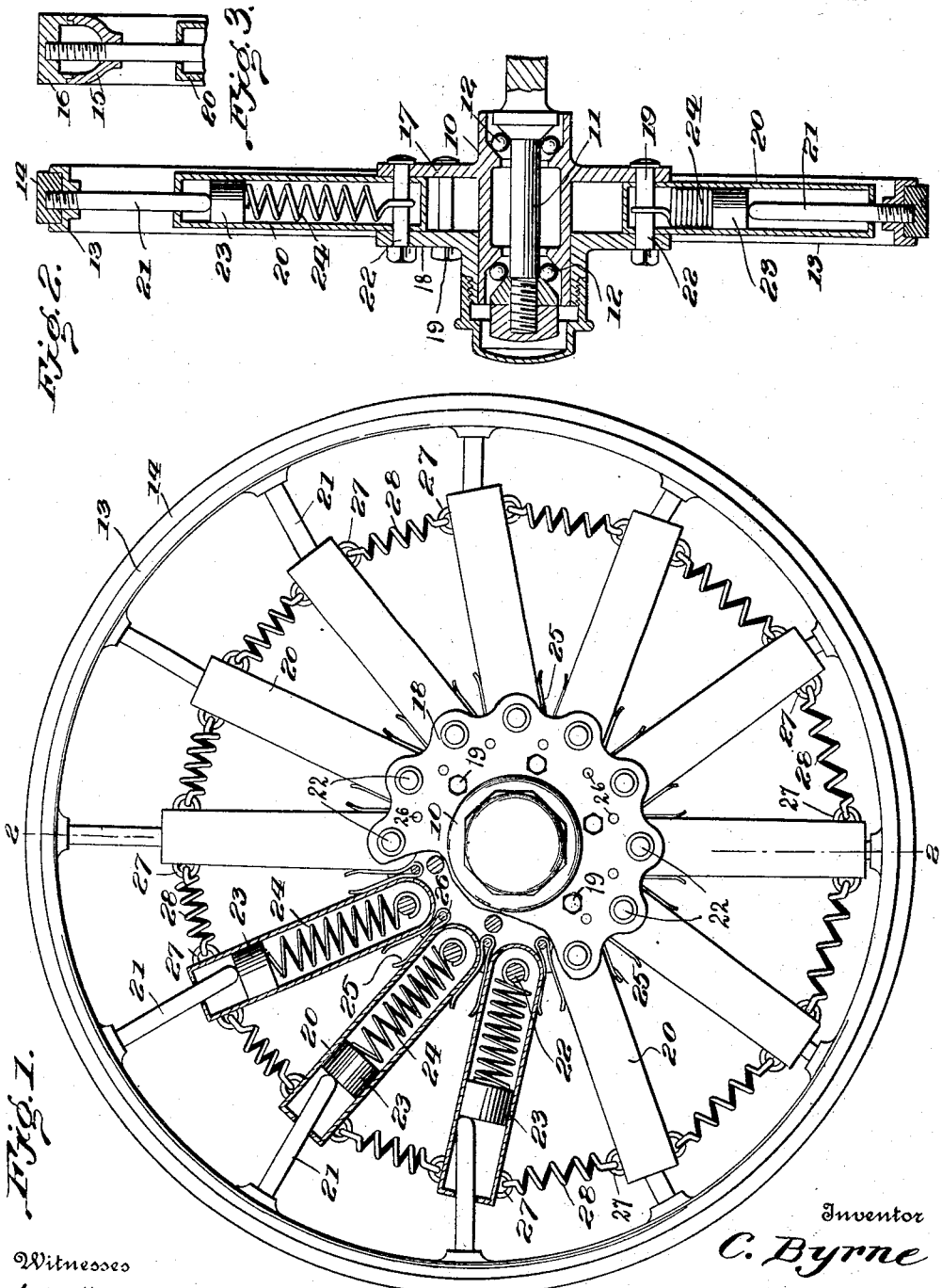

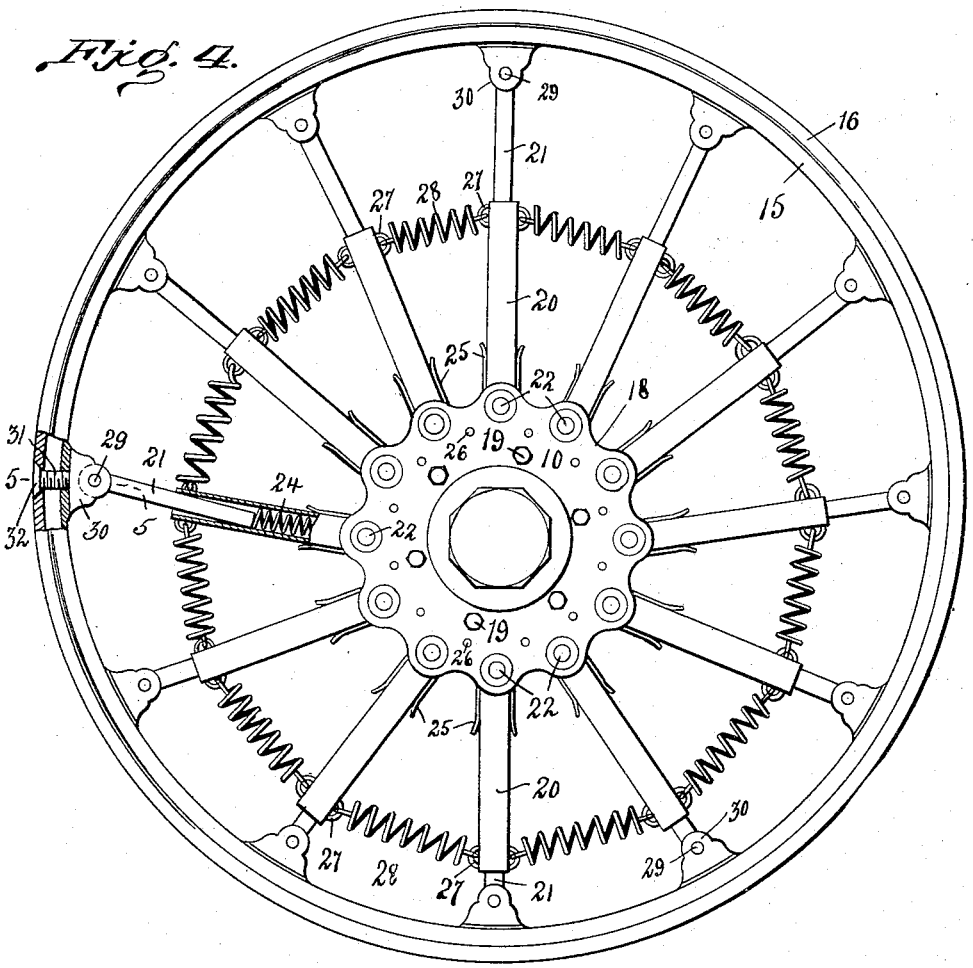
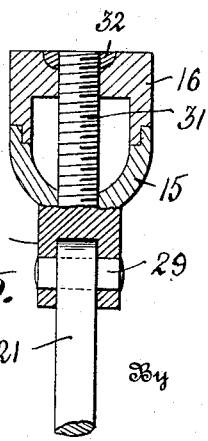

UNITED STATES PATENT OFFICE.

CLARE BYRNE, OF WAGNER, SOUTH DAKOTA.

SPRING-WHEEL.

1,203,480.  Specification of Letters Patent.  Patented Oct. 31, 1916.

Application filed April 30, 1914. Serial No. 835,528.

*To all whom it may concern:*

Be it known that I, CLARE BYRNE, citizen of the United States, residing at Wagner, in the county of Charles Mix and State of South Dakota, have invented certain new and useful Improvements in Spring-Wheels, of which the following is a specification.

This invention relates to improvements in vehicle wheels, more particularly to devices of this character employed upon automobiles and similar vehicles, and has for one of its objects to provide a wheel which possesses all of the advantages of ordinary pneumatic tired wheel with the danger of puncture eliminated.

Another object of the invention is to provide a wheel of this character of increased efficiency, durability and flexibility.

Another object of the invention is to provide a simply constructed wheel wherein the parts are readily separable to enable broken or impaired parts to be restored without dismembering the entire wheel.

With these and other objects in view the invention consists in certain novel features of construction as hereinafter shown and described and then specifically pointed out in the claims; and in the drawings illustrative of the preferred embodiment of the invention—Figure 1 is a side elevation partly in section of one of the improved wheels and showing the hub depressed. Fig. 2 is a section on the line 2—2 of Fig. 1. Fig. 3 is a sectional detail illustrating a slight modification in the construction. Fig. 4 is a view similar to Fig. 1 illustrating another modification in the construction and showing the hub depressed. Fig. 5 is an enlarged sectional detail on the line 5—5 of Fig. 4.

Corresponding and like parts are referred to in the following description and indicated in all the views of the drawings by the same reference characters.

The improved wheel may be formed with the hub and rim portions of any suitable construction, but for the purpose of illustration the wheel is shown including a conventional hub structure represented as a whole at 10 mounted upon an axle journal represented at 11 with the usual bearing balls 12. The rim of the wheel may be of a form illustrated in Figs. 1 and 2 and including a channeled annular member 13 and the yieldable tire 14 engaging in the channeled outer face, or constructed as illustrated in Figs. 3, 4 and 5 formed of coacting annular members 15—16 whereby a hollow rim is produced to secure the necessary strength combined with great lightness.

While I have illustrated two forms of tire or rim, it will be obvious that the invention is not necessarily limited to any specific form of tire or rim, and it is not desired therefore to limit the invention in this respect, or to any specific construction of hub.

The body portion 10 of the hub is formed with an outwardly directed flange 17 integral with the body of the hub and with a detachable flange 18 spaced from the flange 17, the two flanges being united in the usual manner by clamp bolts or similar devices 19. The rim and hub of the wheel are coupled by a novel form of spoke device, each spoke comprising an inner tubular section 20 and an outer rod-like section 21. At their inner ends the tubular spoke sections 20 extend between the flanges 17—18 and are pivoted therein as represented at 22. In the construction shown in Figs. 1, 2 and 3 the outer ends of the spoke sections 21 are rigidly secured in the rim 13 or 15, as the case may be, and slidably engage by their inner portions within the tubular spoke sections 20. In Fig. 2 the spoke sections 21 are shown threaded in the rim, and extended into the tire member 14, and in Fig. 3 are extended into the tire member 16. By this means the outer spoke sections are utilized to firmly couple the members 13—14, or the members 15—16 together, as the case may be. In the construction shown in Figs. 1 and 2 a block 23 is shown slidably disposed within each of the tubular spoke sections 20, each block being of sufficient length to prevent it from being overturned within the spoke section, but free to slide therein. Located within each tubular spoke section between the blocks 23 and the pivots 22 is a spring 24, each spring being preferably coupled by one of its terminals around one of the pivots 22 and bearing at its outer end against the inner face of the block 23, while the inner end of the spoke sections 21 are preferably rounded and bear respectively against the outer faces of the blocks. In the structure shown in Figs. 1, 2 and 3 the tubular spoke sections are considerably larger than the outer spoke sections 21, so that considerable play is left between the inner ends of the spoke sections 21 and the inner walls of the tubular sections 20, so that when pressure is applied to the axle and the latter moved downwardly together with the hub 10 and its flanges 17—18, the parts will not be cramped or be broken, as illustrated in Fig. 1.

Located between each pair of the tubular spoke sections 20 are springs 25, preferably of the leaf form, and secured in any suitable manner, preferably by transverse pins 26 which extend through the flanges 17—18 between each pair of the pivots 22. The springs 25 thus operate to maintain the tubular spoke sections yieldably in position and to return them to their normal position when the pressure upon the axle is released and the hub and its attachments returned to their normal concentric position relative to the rim.

Each of the tubular spoke sections 20 is provided with loops 27 at their outer ends, and the loops of each pair of the tubular sections adapted to be coupled by additional springs 28, if required.

The springs 28 are formed with hooks at their terminals to enable them to be readily engaged with and detached from the loops 27, so that the springs may be readily applied to the wheel or removed therefrom as required. While running upon smooth level roads the springs 28 will not generally be required, but when operating over rough or muddy roads, the springs 28 will be found of great advantage to hold the parts from abnormal movement when the vehicle is subjected to heavy jolts or jars.

In Figs. 4 and 5 the outer spoke members 21 are shown pivoted at 29 in blocks 30, the latter having studs 31 extending through the rim members 15—16 and having terminal nuts 32 engaging in recesses in the outer rim member 16. By this arrangement the inner tubular spoke sections may be constructed considerably smaller than where the outer spoke sections are rigidly coupled to the rim, as will be obvious.

By this simple arrangement an efficient spring wheel is produced which is strong and durable and may be applied to various forms of vehicles, such as automobiles and motorcycles, but may likewise be employed upon buggies, carriages, or like vehicles.

Having thus described the invention, what is claimed as new is:

1. In a wheel, a rim, a hub, outer spoke sections rigidly connected with the rim, inner spoke sections pivotally connected with the hub and slidably fitting the outer spoke sections, the said inner spoke sections being arranged to have oscillatory movement with relation to the hub and to the outer spoke sections, means carried by the inner spoke sections yieldably bearing outwardly against the outer spoke sections, and means yieldably resisting relative movement of the inner spoke sections.

2. In a wheel, a rim, a hub, outer spoke sections rigidly connected with the rim, inner spoke sections pivotally connected with the hub and slidably fitting the outer spoke sections, the said inner spoke sections being arranged to have oscillatory movement with relation to the hub and to the outer spoke sections, means carried by the inner spoke sections yieldably bearing outwardly against the outer spoke sections, and means yieldably resisting relative movement of the inner spoke sections and detachably assembled therewith.

3. In a wheel, a rim, a hub, outer spoke sections rigidly connected with the rim, tubular inner spoke sections pivotally connected with the hub and each provided with a closed outer end having an opening slidably receiving the corresponding outer spoke section, the opening being of a diameter less than the interior diameter of the said inner spoke section and the walls of the openings in the said inner spoke sections constituting fulcrums coöperating with the outer spoke sections whereby the inner spoke sections may have oscillatory movement with relation to the hub and to the outer spoke sections, and means carried by the inner spoke sections and yieldably bearing outwardly against the outer spoke sections.

4. A wheel comprising a hub embodying spaced flanges, tubular spoke sections having their inner ends pivoted between the flanges of the hub, leaf springs between the inner ends of the spoke sections and secured to the flanges of the hub, other springs connecting the outer ends of the tubular spoke sections and exerting a tension thereon in the plane of the wheel, expansible springs located within the tubular spoke sections, blocks supported upon the expansible springs within the tubular spoke sections, the latter having their outer ends contracted and outer spoke sections extending inwardly from the rim and slidingly engaging the contracted ends of the tubular spoke sections and having a to and fro movement at their inner extremities upon the said blocks.

In testimony whereof I affix my signature in presence of two witnesses.

CLARE BYRNE. [L. S.]

Witnesses:
L. V. HASKELL,
W. H. FRIES.

Copies of this patent may be obtained for five cents each, by addressing the "Commissioner of Patents, Washington, D. C."